United States Patent
Caruel et al.

(10) Patent No.: US 8,448,896 B2
(45) Date of Patent: May 28, 2013

(54) GUIDING SYSTEM FOR AIRCRAFT NACELLE MAINTENANCE

(75) Inventors: Pierre Caruel, Le Havre (FR); Jean-Philippe Joret, Beuzeville (FR); Peter Segat, Le Havre (FR)

(73) Assignee: Aircelle, Gonfreville l'Orcher ( * ) Notice: Subject to any disclaimer, the term of this patent is extended or adjusted under 35 U.S.C. 154(b) by 252 days.

(21) Appl. No.: 12/864,925

(22) PCT Filed: Jan. 21, 2009

(86) PCT No.: PCT/FR2009/000062
§ 371 (c)(1),
(2), (4) Date: Jul. 28, 2010

(87) PCT Pub. No.: WO2009/109713
PCT Pub. Date: Sep. 11, 2009

(65) Prior Publication Data
US 2010/0327110 A1    Dec. 30, 2010

(30) Foreign Application Priority Data
Jan. 30, 2008    (FR) ..................................... 08 00501

(51) Int. Cl.
*B64D 27/00*    (2006.01)
(52) U.S. Cl.
USPC .......................... 244/54; 244/110 B; 60/226.2
(58) Field of Classification Search
USPC .. 244/53 R, 54, 110 B; 60/226.2; 239/265.29
See application file for complete search history.

(56) References Cited

U.S. PATENT DOCUMENTS

| 4,920,744 | A | * | 5/1990 | Garcia et al. ................. 60/226.1 |
| 6,220,546 | B1 | * | 4/2001 | Klamka et al. ............. 244/129.4 |
| 2007/0267539 | A1 | * | 11/2007 | Bulin .......................... 244/53 R |
| 2008/0315034 | A1 | * | 12/2008 | Vauchel et al. .................. 244/54 |
| 2010/0170984 | A1 | * | 7/2010 | Journade et al. .............. 244/1 N |

FOREIGN PATENT DOCUMENTS

| FR | 26622930 A1 | 5/1989 |
| FR | 2897339 A1 | 8/2006 |
| FR | 2901244 A1 | 11/2007 |

OTHER PUBLICATIONS

International Search Report PCT/FR2009/000062 Dated Sep. 9, 2009.

* cited by examiner

*Primary Examiner* — Timothy D Collins
*Assistant Examiner* — Jamie S Stehle
(74) *Attorney, Agent, or Firm* — Brinks Hofer Gilson & Lione

(57) ABSTRACT

A nacelle includes a downstream structure having an outer structure, a concentric inner structure surrounding a downstream portion and an upstream section having a relatively small diameter and a downstream section having a relatively large diameter, the inner and outer structures define an annular flow channel. The nacelle includes a guiding system for connecting the inner structure and downstream portion or a portion of a suspension mast, the system combines a translation and rotation movement of at least a portion of the inner structure between a working position, where the inner structure is used as a cowling for the turbojet downstream portion, and a maintenance position where the inner structure exposes the turbojet downstream portion and enable movement of the portion of the inner structure along the profile of the upstream section having a relatively small diameter, and the downstream section having a relatively large diameter.

17 Claims, 8 Drawing Sheets

GUIDING SYSTEM FOR AIRCRAFT NACELLE MAINTENANCE

TECHNICAL FIELD

The invention concerns in particular a turbojet nacelle for an aircraft.

BACKGROUND

An aircraft is moved by several turbojets each housed in a nacelle also housing a set of related actuating device connected to its operation and ensuring various functions when the turbojet is in operation or stopped. These connected actuating devices in particular comprise a thrust reverser mechanical actuating system.

A nacelle generally has a tubular structure comprising an air intake upstream from the turbojet, a middle section designed to surround a fan of the turbojet, a downstream section housing thrust reverser means and designed to surround the combustion chamber of the turbojet. The tubular structure is generally ended by a jet nozzle whereof the outlet is situated downstream from the turbojet.

The term "downstream" here refers to the direction corresponding to the direction of the cold air stream penetrating the turbojet. The term "upstream" designates the opposite direction.

Modern nacelles are designed to house a dual flow turbojet capable of generating, via the rotating fan blades, a hot air flow (also called "primary flow") coming from the combustion chamber of the turbojet, and a cold air flow ("secondary flow") which circulates outside the turbojet through a passage that is also annular, called tunnel.

A turbojet usually includes a portion called "upstream" comprising the blades of the fan and a portion called "downstream" housing the gas generator.

A nacelle for such an engine generally has an outer structure, called Outer Fixed Structure (OFS), and a concentric inner structure, called Inner Fixed Structure (IFS), surrounding the structure of the engine strictly speaking downstream from the fan. The inner and outer structures define a tunnel designed to channel the flow of cold air that circulates outside the engine. The primary and secondary flows are ejected from the engine via the rear of the nacelle.

Each propulsion assembly of the aircraft is thus formed by a nacelle and an engine that are suspended to a fixed structure of the aircraft, for example under a wing or on the fuselage, via a suspension pylon or mast attached to the engine or nacelle.

It is currently known to proceed with maintenance of the turbojet engine by accessing localized zones of the engine using hatches situated on the IFS that only allow access to a limited zone that is difficult for bulky maintenance tools to reach.

According to one alternative, the IFS can include two lateral downstream and upstream sections, the lateral downstream section being mobile in translation relative to the engine. This embodiment only allows access to the pieces of the engine situated at the downstream end thereof.

According to still another alternative, the IFS includes a system of slides causing the IFS to translate along the axis of the engine. The IFS abutting on the OFS in the opening position of the IFS, the withdrawal of the IFS is limited in this embodiment, which only allows partial access to the parts situated at the upstream end of the engine.

In order to allow an inspection over all of the engine, usually proposed are embodiments in which the nacelle 1 surrounds the engine of the turbojet 5 via a downstream structure comprising an outer structure 6 (OFS) and an inner structure 9 (IFS) (see FIGS. 1 and 2). The nacelle 1 is, moreover, attached to a suspension mast 10. The inner structure 9 of the nacelle is usually formed by two elements 9a and 9b of essentially semi-cylindrical shape, on either side of a longitudinal vertical plane of symmetry 11 of the nacelle 1. The two elements 9a and 9b are mounted mobile so as to be able to deploy between a working position and a maintenance position in order to provide access to the engine for maintenance operations.

To do this, the two elements 9a and 9b are mounted pivoting around a longitudinal axis forming a hinge in the upper portion 13 (at the 12 o'clock position) of the reverser. The two elements 9a and 9b are maintained in the closing position using bolts arranged along a junction line 15 situated in the lower portion (at the 6 o'clock position).

In order to access the engine, it is first necessary to move the outer structure 6 to be able to open the two elements 9a and 9b. The outer 6 and inner 9 structures are connected and kept open by a system of cylinders and rods (not shown).

However, this embodiment involves causing the elements to pivot at the downstream end of the nacelle, which requires the addition of additional devices and a structure adapted to allow this movement. The structure thus obtained is complex and heavy due to the fact that the stresses pass through periodic locations such as hinges and bolts.

BRIEF SUMMARY

One aim of the present invention is to provide a nacelle for turbojet allowing access to the engine in its entirety, simplifying maintenance operations.

To that end, according to a first aspect, the invention provides a nacelle for turbojet of an aircraft, including a downstream structure comprising: an outer structure,
  a concentric inner structure designed to surround a downstream part of the turbojet and comprising an upstream section having a relatively small diameter and a downstream section having a relatively large diameter, said inner structure defining, with the outer structure, an annular flow channel, and
  a guiding system designed to connect the inner structure and the downstream portion of the turbojet or a portion of a suspension mast,
  characterized in that the guiding system comprises means for combining a translation and rotation movement of at least one portion of said inner structure between a working position in which the inner structure serves as cowling of the turbojet downstream portion and a maintenance position in which the inner structure exposes said turbojet downstream portion, allowing the movement of said portion of the inner structure along the profile of the upstream section having a relatively small diameter, and then of the downstream section having a relatively large diameter.

"Downstream section having a relatively large diameter" and "upstream section having a relatively small diameter" refer to two sections whereof one has a smaller diameter than the other.

The nacelle according to the present invention includes guiding means making it possible to move the inner structure along the profile of the upstream section having a relatively small diameter, and then of the downstream section having a relatively large diameter while keeping the outer structure fixed. In other words, the inner structure moves toward the downstream direction first by moving away from the engine, and then by translating so as to follow the profile of the downstream portion of the turbojet. During the movement of the inner structure, the latter remains in the tunnel formed by the fixed outer structure and the inner structure in the working position. Moreover, the nacelle of the invention advantageously makes it possible to ensure movement of the inner structure without risk of colliding with or damaging the elements of the downstream section of the outer structure of the nacelle.

Thus, the inner structure is withdrawn downstream, leaving the downstream portion and therefore the engine of the turbojet essentially exposed. The direct access to the turbojet from the outside of the nacelle is, for example, done by opening a door or a grid of the thrust reversers. Because of this, the invention allows easy access for people and tools to a substantially larger portion of the engine than that of the prior art.

According to the invention, the downstream structure of the nacelle of the invention does not include an outer structure integral with the inner structure via a support beam-type structure as well as hinges ensuring the opening of the inner and outer structures, as is the case in the prior art. Thus, it is possible to eliminate, over a significant length in the lower portion in the 6 o'clock position, the surface ensuring the junction between the inner and outer structure, called lower bifurcation. An upper bifurcation in the 12 o'clock position allows the cowling of the suspension mast. Likewise, the structure and the equipment necessary for the pivoting and fastening of the two lateral structures 9a and 9b can be eliminated. Because of this, the nacelle of the invention has improved mass, improved flexibility, reduced maintenance complexity and reduced bulk. As an example, a nacelle of the invention makes it possible to reduce the weight of each thrust reverser by about 5%. Likewise, losses through air friction are reduced due to the reduction of the wet surface in contact with the air after the reduction of the length of the lower bifurcation. As an example, the reduction translates to a decrease in the fuel consumption by the engine in the vicinity of 0.1%.

Likewise, a maintenance operation does not require moving part of the outer structure or other elements of the nacelle of the invention to allow opening of the inner structure. Thus, the number of operations necessary to access the engine is reduced.

According to other features of the invention, the structure of the invention includes one or several of the following optional features considered alone or according to all possible combinations:

- the inner structure is realized in the form of at least two elements, which allows easier opening of the inner structure and also access to localized zones without opening all of the inner structure;
- the elements are situated on either side of a longitudinal plane of symmetry of the nacelle, which allows access to zones situated on either side of the engine;
- the guiding system includes at least one upstream rod and at least one downstream rod of different lengths and designed to connect the inner structure to the turbojet downstream portion or to a part of the suspension mast such that the respective axes of said rods are contained in planes parallel to the axis of the turbojet with said axes being parallel to each other, which makes it possible to obtain a coupled rotation and translation movement that very closely follows the profile of the turbojet;
- the guiding system includes at least one rod designed to connect the inner structure and the turbojet downstream portion or a portion of the suspension mast, and at least one sliding means capable of sliding in a corresponding slide designed to be mounted on the turbojet, which makes it possible to move the inner structure as close as possible to the turbojet profile;
- a pivot connects the slide to the inner structure;
- the axis of each slide is contained in a plane parallel to the axis of the turbojet, which makes it possible to withdraw the inner structure even more in the downstream direction;
- the guiding system includes at least one downstream sliding means and at least one upstream sliding means connected to the inner structure and capable of sliding each in a corresponding slide designed to be mounted on the turbojet or on a portion of the suspension mast, and at least two pivots connecting each slide to the inner structure, which makes it possible to even better release the inner structure;
- the inner structure includes at least one device for locking in the working position, which makes it possible to secure the nacelle when the aircraft is in operation;
- said locking device can be activated through a flexible downstream actuating cable upstream from the inner structure, which allows easy actuation of the locking device.

According to a second aspect, the invention concerns a dual flow turbojet designed to be inserted into a nacelle according to the invention, including a downstream portion comprising an upstream section having a relatively small diameter and a downstream section having a relatively large diameter, characterized in that it includes mounting means mounted on the downstream portion and configured to cooperate with the guiding system of the inner structure of the nacelle such that the inner structure moves by combining a rotation and translation movement along the profile of the upstream section having a relatively small diameter, then the downstream section having a relatively large diameter between a working position in which the inner structure serves as cowling for the turbojet downstream portion and a maintenance position in which the inner structure exposes said turbojet downstream portion.

According to one preferred embodiment, the mounting means include rails or slides capable of cooperating with the guiding system of the inner structure of the nacelle. Such guiding means ensure easier opening to perform a maintenance operation on the engine.

According to another aspect, the invention concerns a suspension mast designed to fasten a turbojet to a wing of an aircraft, said turbojet being essentially surrounded by a nacelle according to the invention, characterized in that it includes mounting means configured to cooperate with the guiding system of the inner structure of the nacelle such that at least one portion of said inner structure combines a translation and rotation movement between a working position in which the inner structure serves as cowling of the turbojet downstream portion and a maintenance position in which the inner structure exposes the turbojet downstream portion, allowing the movement of said inner structure along the profile of the upstream section having a relatively small diameter, then of the downstream section having a relatively large diameter.

According to one preferred embodiment, the mounting means include rails or slides capable of cooperating with the guiding system of the inner structure of the nacelle.

According to yet another aspect, the invention concerns a propulsion assembly for aircraft, characterized in that it comprises, on one hand, a turbojet according to the invention or a mast according to the invention and, on the other hand, a corresponding nacelle according to the invention.

BRIEF DESCRIPTION OF THE DRAWINGS

The invention will be better understood upon reading the following non-limiting description, done in reference to the appended figures.

DETAILED DESCRIPTION

Figure 1:
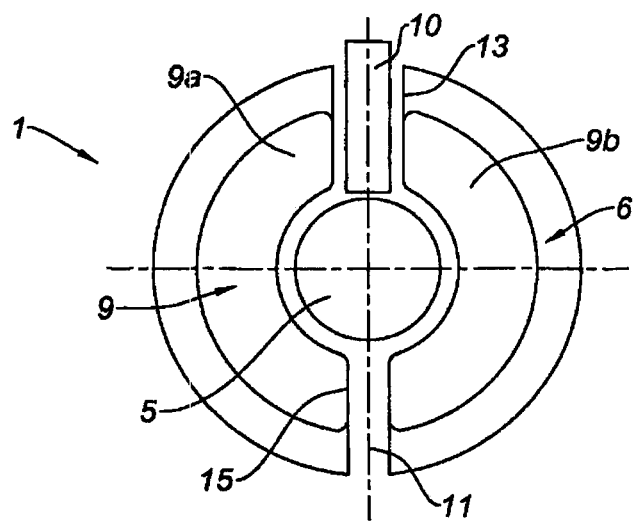
FIG. 1 is a transverse cross-section of a nacelle of the prior art in the working position.
Figure 2:
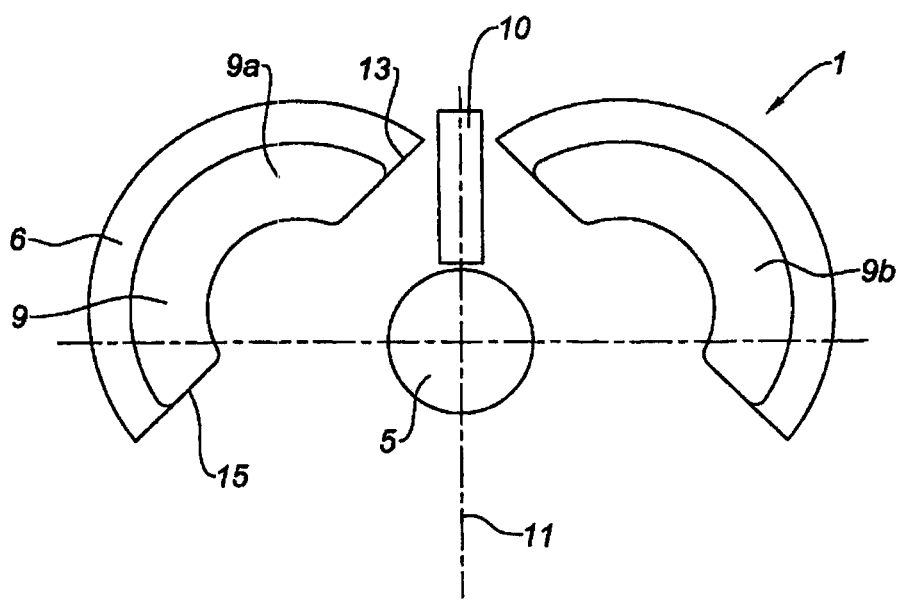
FIG. 2 is a transverse cross-section of the nacelle of FIG. 1 in maintenance position.
Figure 3:
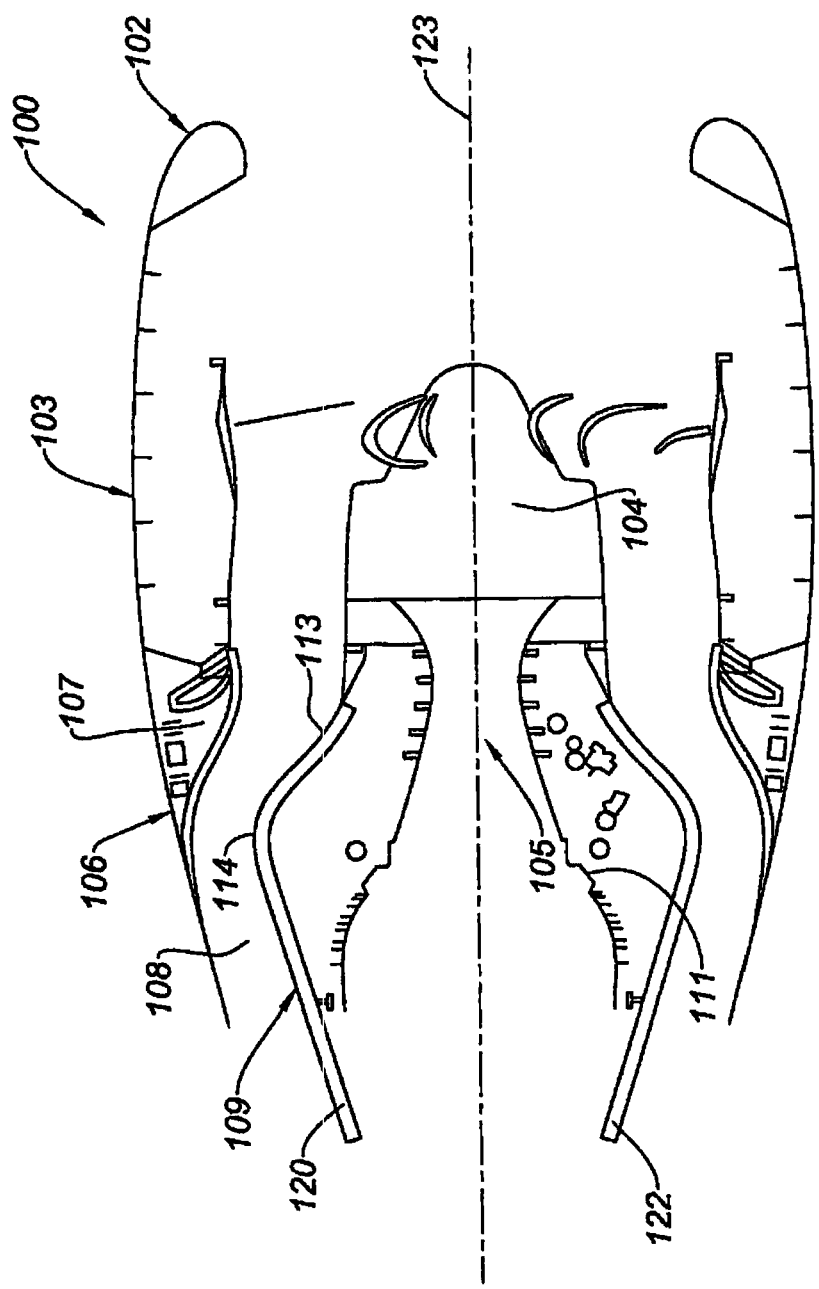
FIG. 3 is a transverse cross-section of a nacelle according to the invention including an inner structure in working position.
Figure 4:
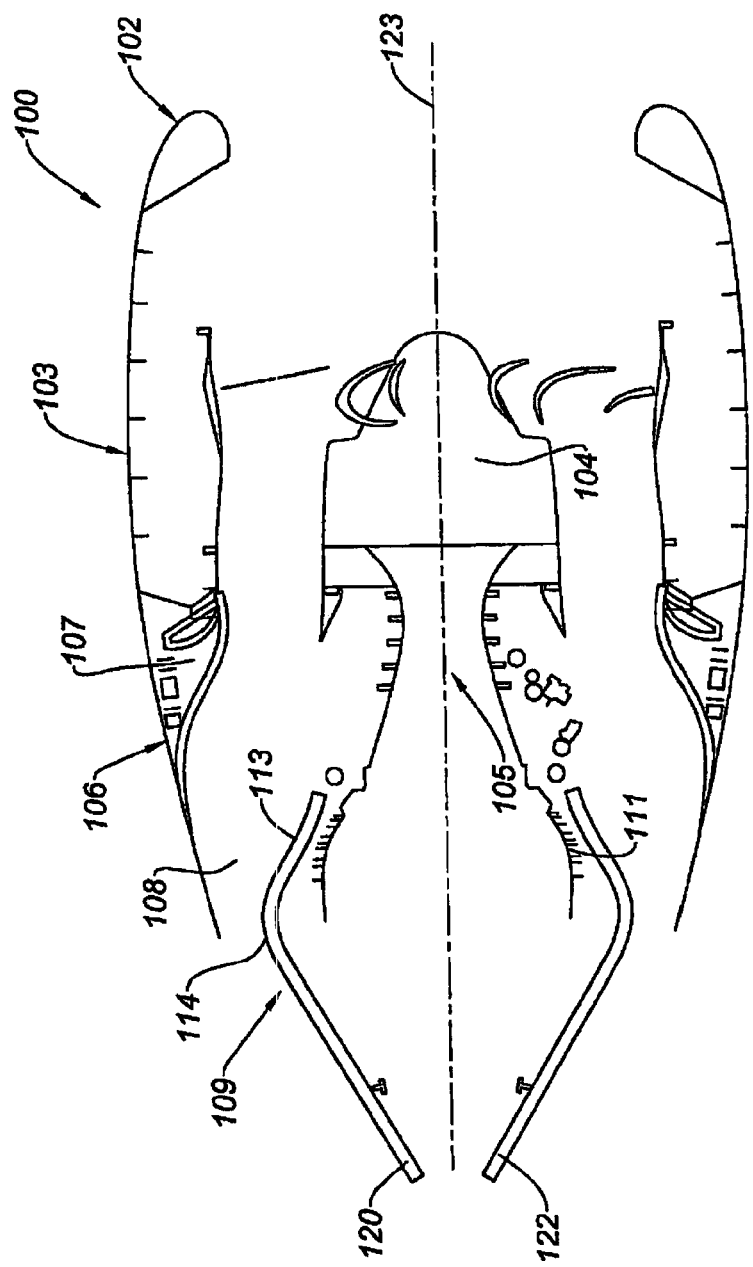
FIG. 4 is a cross-sectional profile view of a nacelle according to FIG. 1 in maintenance position.

As illustrated in FIG. 3, a nacelle 100 according to the invention comprises an upstream air intake structure 102, a middle structure 103 surrounding a fan 104 of a turbojet 105, and a downstream structure comprising, in a known manner, an outer structure 106, called OFS, housing thrust reverser means 107. The nacelle 100 according to the invention is fixed downstream via any appropriate means, in particular rods, to the turbojet 105 and/or to a suspension mast, not shown, designed to fasten the turbojet 105 under an aircraft wing.

The thrust reverser means 107 are, for example, made up of one or several doors or one or several grids.

The outer structure 107 also defines an annular flow channel 108 with a concentric inner structure 109, called IFS, designed to surround a downstream portion 111 of the turbojet extending downstream of the fan.

The inner structure 109 includes an upstream section 113 having a relatively small diameter widening in a downstream section 114 having a relatively large diameter so as to essentially follow the profile of the turbojet 105.

According to one preferred embodiment, the inner structure 109 is formed by at least two elements, in particular two elements 120 and 122. The elements 120 and 122 allow easier opening of the inner structure 109. Moreover, the elements 120 and 122 allow access to localized zones of the inner structure 109 without opening all of said inner structure. Preferably, the elements 120 and 122 are situated on either side of a longitudinal plane of symmetry 123 of the nacelle. Such an arrangement ensures opening of the inner structure 109 at zones of the turbojet 105 situated opposite each other.

According to the embodiment illustrated in FIG. 3, the elements 120 and 122 are essentially semi-cylindrical, but these elements 120 and 122 can have any other shape known by those skilled in the art compatible with the profile of the turbojet 105. Thus, the structure of the turbojet 105 is essentially concealed by the elements 120 and 122 (FIG. 3) in the working position, i.e. in the position allowing the aircraft to function and in particular to fly.

Moreover, a guiding system 140 is designed to connect the inner structure 109 to the downstream portion 111 of the turbojet. The guiding system 140 allows the movement of at least part of the inner structure 109 along the profile of the upstream section having a relatively small diameter 113, and then of the downstream section having a relatively large diameter 114 by combining a translation and rotation movement between a working position in which the inner structure 109 serves as cowling of the downstream portion 111 of the turbojet and a maintenance position in which the inner structure 109 exposes said downstream portion 111 of the turbojet.

Moreover, the guiding system 140 advantageously makes it possible for the inner structure 109 to remain during its movement in the air flow tunnel 108 without colliding with the outer structure 106 and avoiding the downstream portion 111 of the turbojet.

According to one embodiment, the guiding system 140 can be attached on the turbojet 105 or on the suspension mast making it possible to fasten the nacelle 100 of the invention to a wing of an aircraft.

Figure 5:
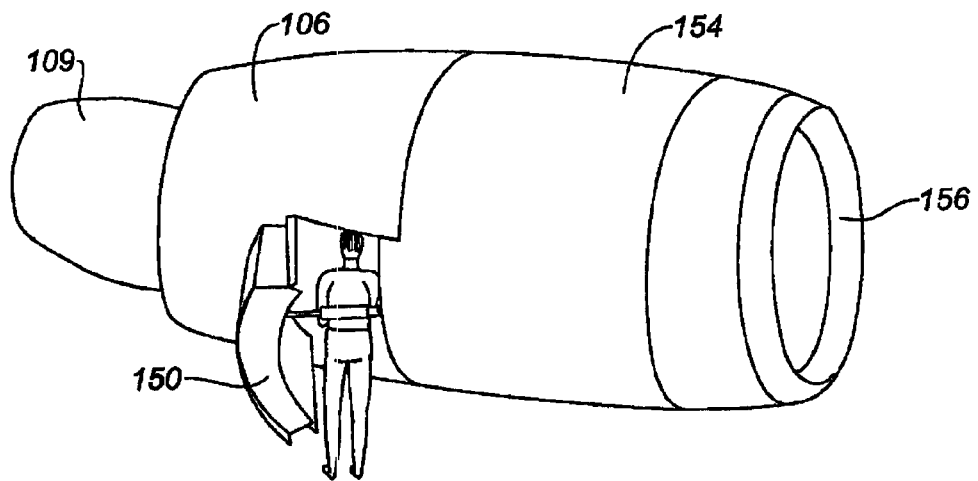
FIG. 5 is a side view of a nacelle according to the invention in maintenance position.
Figure 6:
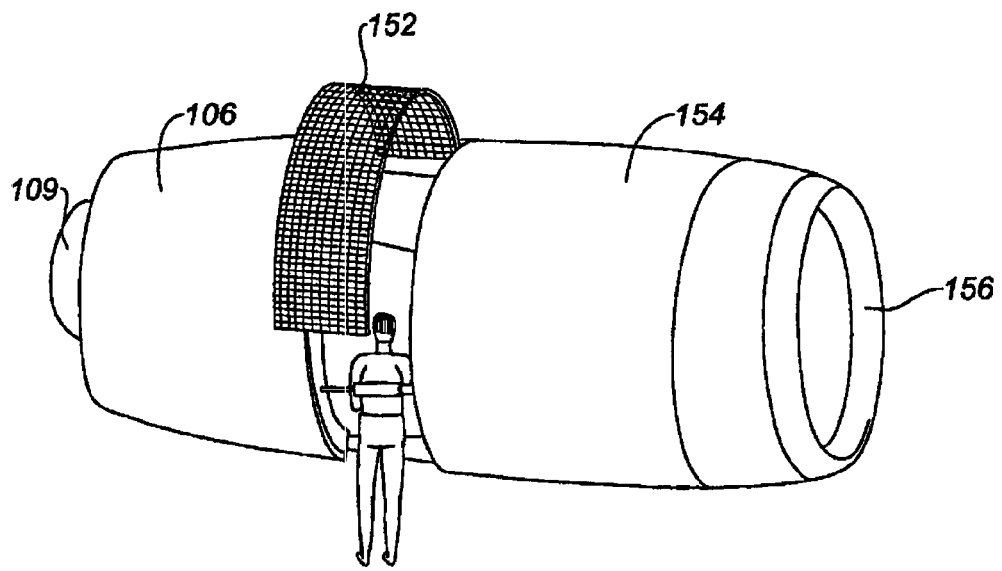
FIG. 6 is a side view of an alternative of the nacelle according to FIG. 5.
Figure 7:
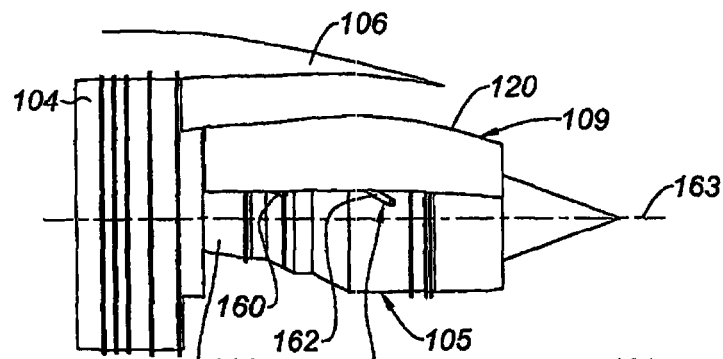
FIGS. 7 to 10 are perspective views of an embodiment of the nacelle according to the invention.
Figure 8:
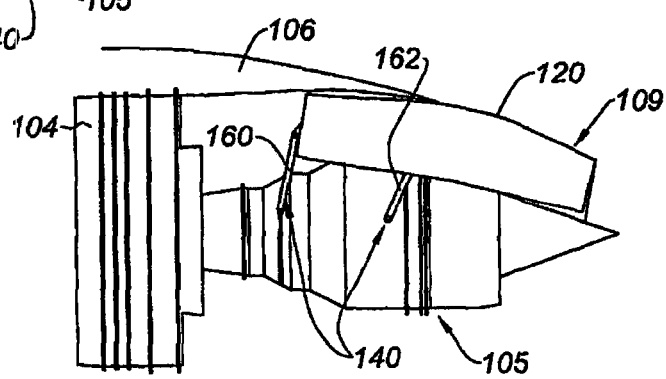
Figure 9:
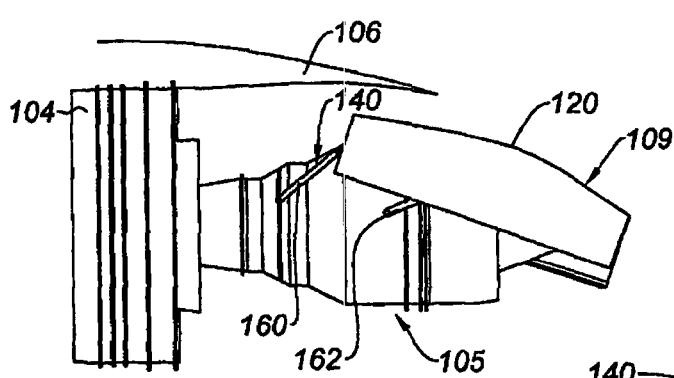
Figure 10:
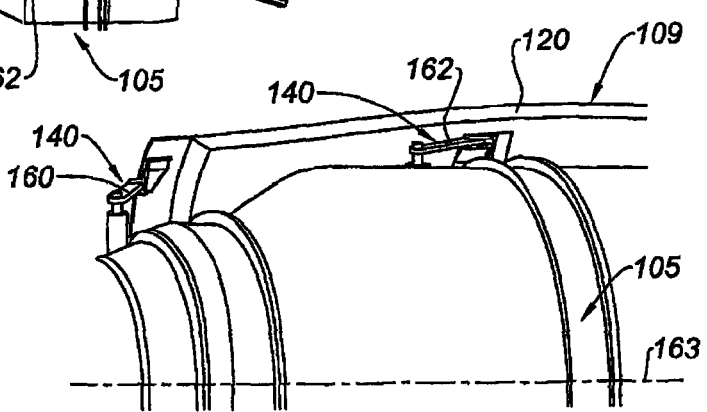
Figure 11:
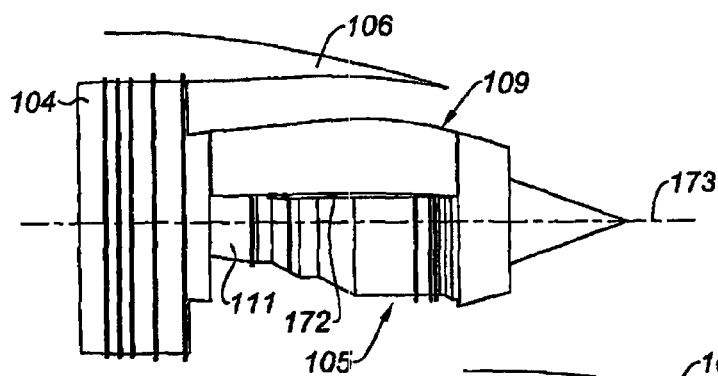
FIGS. 11 to 14 are perspective views of a second embodiment of a nacelle according to the invention.
Figure 12:
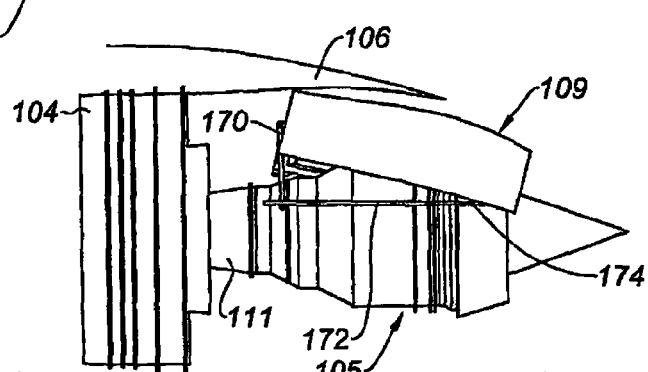
Figure 13:
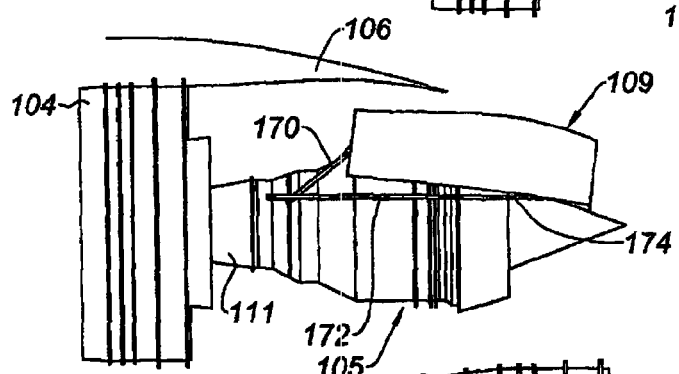
Figure 14:
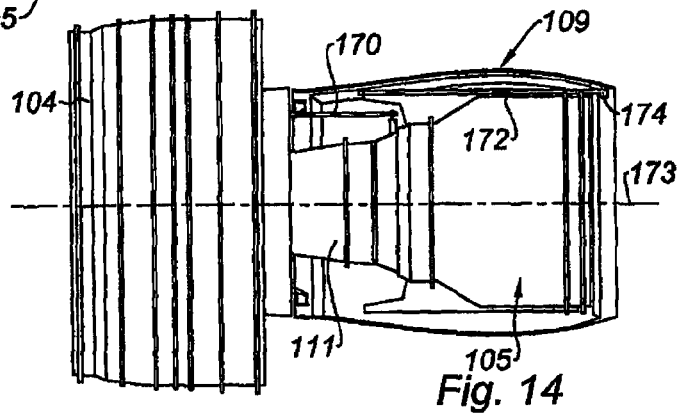
Figure 15:
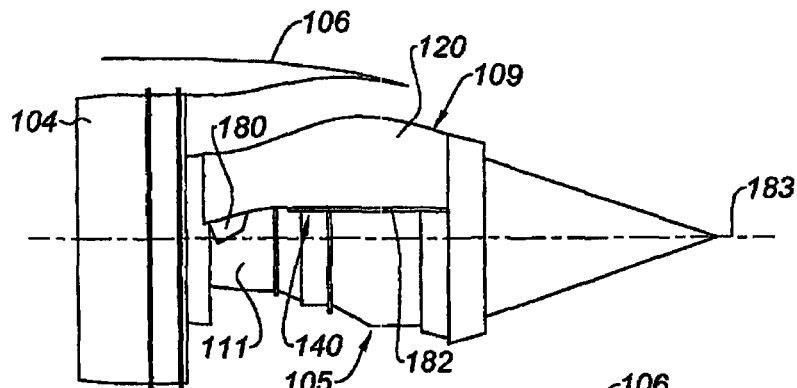
FIGS. 15 to 18 are perspective views of a third embodiment of a nacelle according to the invention.
Figure 16:
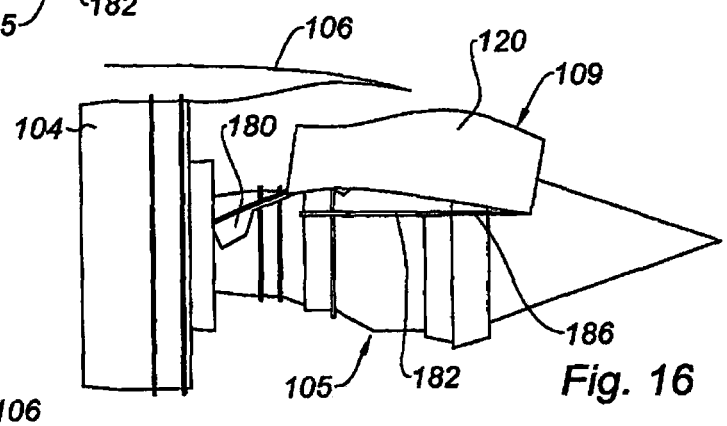
Figure 17:
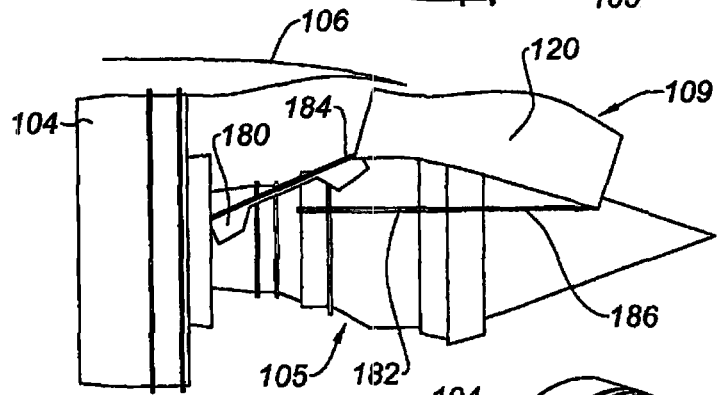
Figure 18:
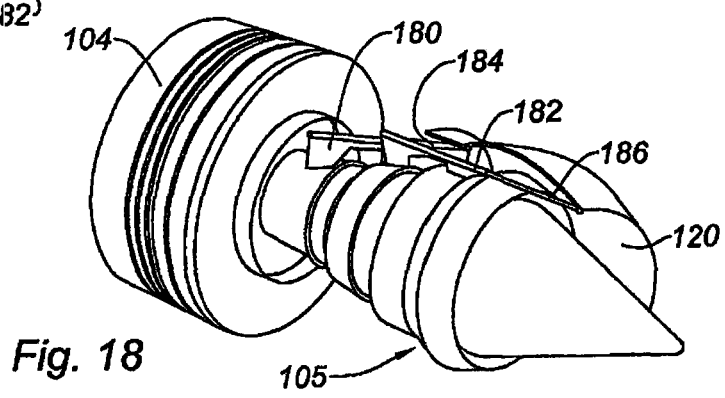

According to the embodiment illustrated in FIGS. 5 and 6, the outer structure 106 includes as thrust reverser means a door 150 (FIG. 5) or a set of grids 152 (FIG. 6). The door 150 and the set of grids 152 are capable of being opened or closed via bolts (not shown) situated on the outer structure 106. Moreover, the nacelle 100 according to the invention also includes an upstream structure 154 comprising an air intake structure 156 through which the cold air penetrates.

In the case of FIG. 5, the inner structure 109 is moved downstream of the turbojet 105 by the guiding system 140. Access to the turbojet is done by opening the door 150, the outer structure 106 remaining fixed.

In the case of FIG. 6, the inner structure 109 is also moved downstream of the turbojet 105 by the guiding system 140. In this case, access to the turbojet 105 is done by opening grids 152, which involves moving the outer structure 106 downstream as well.

According to the embodiments shown in FIGS. 7 to 10, the guiding system 140 includes at least one upstream rod and at least one downstream rod.

In the case where the inner structure 109 includes several elements 120, each element can include a guiding system 140 including at least one upstream rod and at least one downstream rod.

The guiding system 140 includes in particular four upstream rods, preferably two upstream rods 160, and in particular four downstream rods, preferably two downstream rods 162.

In the case where the inner structure 109 includes two elements 120, two upstream and downstream rods that can be mounted at 12 o'clock thereby connecting the turbojet 105 and the first element 120. "Mounted at 12 o'clock" here refers to a device mounted on the portion of the turbojet designed to be close to the suspension mast of the nacelle 100 under the wing of the aircraft. Likewise, two upstream and downstream rods (not shown) can be mounted at 6 o'clock connecting the second element to the turbojet 105. "Mounted at 6 o'clock" here refers to a device mounted diametrically opposite relative to the rods arranged at 12 o'clock. In the case where the inner structure 109 is made up of more than two elements, each element typically includes the same number of rods arranged appropriately relative to the rods of the first element.

In the particular case where the inner structure 109 only includes one element and where the guiding system 140 only includes one upstream rod and one downstream rod, it can be advantageous to connect the inner structure 109 to a portion of the suspension mast.

In order to allow movement of the inner structure 109 by combining a translation and rotation movement, the two upstream and downstream rods 160 and 162 have different lengths. The downstream rods 160 and upstream rods 162 typically have a length between 0.5 and 1 m, in particular between 0.75 and 0.85 m. Typically, the upstream rod 162 has a length 10 to 20% greater than the length of the downstream rod 160.

Moreover, the rods 160 and 162 connect the inner structure 109 to the downstream portion 111 of the turbojet such that the respective axes of the rods 160 and 162 are contained in planes parallel to the axis 163 of the turbojet 105 without said axes being parallel to each other.

The rods thus arranged 160 and 162 advantageously make it possible to very closely follow the profile of the turbojet 105.

According to the embodiments illustrated in FIGS. 11 to 14, the guiding system 140 includes at least one rod designed to connect the downstream portion 111 of the turbojet and the inner structure 109, and at least one sliding means, capable of sliding in a corresponding slide designed to be mounted on the turbojet 105 or on a portion of the suspension mast. In the case where the inner structure 109 includes several elements 120, each element can include at least one rod and at least one sliding means as previously defined. The guiding system 140 includes in particular two rods, preferably one rod 170, and in particular two sliding means, preferably one sliding means 172. Typically, the sliding means is(are) at least one crosshead, at least one skid or any other means known by a person skilled in the art.

In the case where the inner portion 109 includes at least two elements 120, the guiding system 140 connects said elements 120 to the downstream portion 111 of the turbojet or of the suspension mast. In the particular case where the inner portion 109 only includes one element and where the guiding system 140 only includes one rod 170 and one sliding means 172, it can be advantageous to connect the element of the inner structure 109 to a portion of the suspension mast.

Moreover, the elements 120 have the advantage of being able to move simultaneously.

In the case where the inner structure 109 includes two elements 120, the guiding system 140 can include two rods whereof one is arranged at 12 o'clock and the other at 6 o'clock relative to the turbojet 105, each rod connecting an element. Likewise, the guiding system 140 can include two sliding means sliding in slides situated at 12 o'clock and 6 o'clock whereof the axes are in a plane parallel to the axis 173 of the turbojet 105, each sliding means belonging to an element. As for the preceding embodiment, in the case where the inner structure 109 is made up of more than two elements, each element typically includes the same number of rods arranged appropriately relative to the rods of the first element.

Preferably, a pivot 174 connects the slide 172 to the inner structure 109 making it possible to move the inner structure 109 as close as possible to the profile of the turbojet 105.

Preferably, the axis of each slide 172 is contained in a plane parallel to the axis 173 of the turbojet making it possible to obtain an even more significant withdrawal towards the downstream of the inner structure 109.

According to the embodiment illustrated in FIGS. 15 to 18, the guiding system 140 includes at least one downstream sliding means and at least one upstream sliding means connected to the inner structure 109 and capable of each sliding in a corresponding slide designed to be mounted on the turbojet 105 or on a portion of the suspension mast, and at least one pivot connecting each slide to the inner structure 109, making it possible to even further expose the inner structure 109 towards the downstream.

In the case where the inner structure 109 includes several elements 120, each element can include a guiding system including at least one downstream sliding means and at least one upstream sliding means as previously defined. The guiding system 140 includes in particular four downstream sliding means, preferably two, and in particular four upstream sliding means, preferably two that are capable of sliding in a corresponding slide 180 and 182. Moreover, the guiding system 140 in particular includes eight pivots, preferably four pivots 184 and 186.

The downstream and upstream sliding means are configured so as to slide on or in the slides 180 and 182. Typically, the sliding means are crossheads, skids or any other means known by those skilled in the art.

According to one embodiment, the axes of the two slides 180 and 182 are not parallel to each other. However, the axis of each slide 180, 182 is contained in a plane parallel to the axis 183 of the turbojet 105.

In the case where the inner structure 109 includes two elements 120, the guiding system 140 can include two sliding means sliding in slides situated at 12 o'clock and 6 o'clock whereof the axes are in a plane parallel to the axis of the turbojet 105, each sliding means belonging to an element. As for the preceding embodiments, in the case where the inner structure 109 is made up of more than two elements, each element typically has the same number of sliding means arranged appropriately relative to the sliding means of the first element.

In the particular case where the inner structure 109 only includes one element and where the guiding system 140 only includes one upstream slide and one downstream slide, it can be advantageous to connect the element of the inner structure 109 to a portion of the suspension mast.

Figure 19:
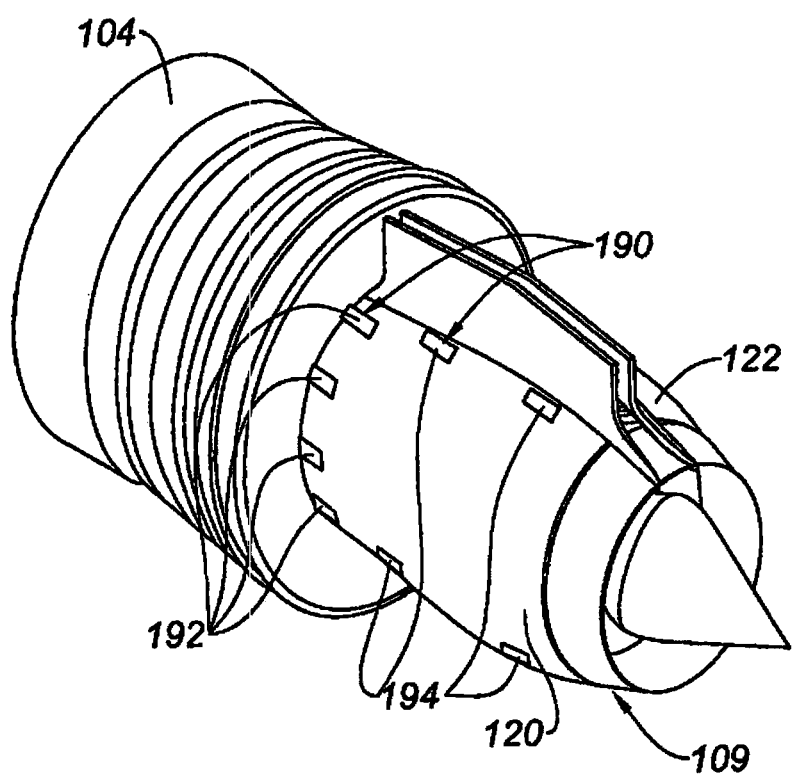
FIG. 19 is a side view of another embodiment of a nacelle according to the invention.

According to the embodiment illustrated in FIG. 19, in the working position, the inner structure 109 includes at least one locking device 190 which makes it possible to secure the nacelle when the aircraft is in operation. The locking device 190 includes, for example, one or several bolts 192 arranged in particular on the case of the turbojet 105 and/or one or several bolts 194 on the suspension mast or on the symmetrical portion of the inner structure 109.

Moreover, preferably, the locking device 190 can be activated through a flexible downstream actuating cable (not shown) upstream from the inner structure 109. Thus, the actuation of the locking device 190 is done easily and potentially remotely.

The invention claimed is:

1. A nacelle for turbojet of an aircraft, including a downstream structure comprising:
   an outer structure,
   a concentric inner structure surrounding a downstream portion of the turbojet and including an upstream section having a relatively small diameter and a downstream section having a relatively large diameter, wherein said inner structure defines together with the outer structure an annular flow channel, and
   a guiding system for connecting the inner structure and the downstream portion of the turbojet engine or a portion of a suspension mast,
   wherein the guiding system includes a means for combining a translation and rotation movement of at least a portion of said inner structure between a working position, in which the inner structure is used as a cowling for the turbojet downstream portion, and a maintenance position in which the inner structure exposes said turbojet downstream portion, thus enabling movement of said portion of the inner structure along the profile of the upstream section having a relatively small diameter, and then of the downstream section having a relatively large diameter, wherein the inner structure rotates about an axis transverse to a longitudinal axis of the nacelle.

2. The nacelle according to claim 1, wherein the inner structure comprises at least two elements.

3. The nacelle according to claim 2, wherein the elements are situated on either side of a longitudinal plane of symmetry of the nacelle.

4. The nacelle according to claim 1, wherein the guiding system includes at least one upstream rod and at least one downstream rod of different lengths and designed to connect the inner structure to the downstream portion of the turbojet or to a portion of the suspension mast such that respective axes of said rods are contained in planes parallel to the longitudinal axis of the turbojet without said axes being parallel to each other.

5. The nacelle according to claim 1, wherein the guiding system includes at least one rod designed to connect the inner structure and the upper portion of the turbojet or a portion of the suspension mast, and at least one sliding means capable of sliding in a corresponding slide designed to be mounted on the turbojet or on a portion of the suspension mast.

6. The nacelle according to claim 5, wherein a pivot connects the slide to the inner structure.

7. The nacelle according to claim 5, wherein the axis of each slide is contained in a plane parallel to the longitudinal axis of the turbojet.

8. The nacelle according to claim 1, wherein the guiding system includes at least one downstream sliding means and at least one upstream sliding means connected to the inner structure and capable of each sliding in a corresponding slide designed to be mounted on the turbojet or on a portion of the suspension mast, and at least one pivot connecting each slide to the inner structure.

9. The nacelle according to claim 1, wherein the inner structure includes at least one locking device in working position.

10. The nacelle according to claim 9, wherein said locking device can be activated through a flexible downstream actuating cable upstream of the inner structure.

11. A dual flow turbojet designed to be inserted into a nacelle according claim 1, including a downstream portion comprising an upstream section having a relatively small diameter and a downstream section having a relatively large diameter, comprising mounting means mounted on the downstream portion and configured to cooperate with the guiding system of the inner structure of the nacelle such that the inner structure moves combining a rotation and translation movement along a profile of the upstream section having a relatively small diameter, then the downstream section having a relatively large diameter between a working position in which the inner structure serves as cowling for the turbojet downstream portion and a maintenance position in which the inner structure exposes said turbojet downstream portion.

12. The turbojet according to claim 11, wherein the mounting means include rails or slides capable of cooperating with the guide system of the inner structure of the nacelle.

13. A suspension mast designed to fasten a turbojet to a wing of an aircraft, said turbojet being essentially surrounded by a nacelle according to claim 1, comprising mounting means configured to cooperate with the guiding system of the inner structure of the nacelle such that at least a portion of said inner structure combines a translation and rotation movement between a working position in which the inner structure serves as cowling for the turbojet downstream portion and a maintenance position in which said inner structure exposes said turbojet downstream portion, allowing movement of said inner structure along a profile of the upstream section having a relatively small diameter, then of the downstream section having a relatively large diameter.

14. The mast according to claim 13, wherein the mounting means include rails or slides capable of cooperating with the guiding system of the inner structure of the nacelle.

15. A propulsion assembly for aircraft comprising a turbojet according to claim 11.

16. A propulsion assembly for aircraft comprising a mast according to claim 13.

17. A propulsion assembly for aircraft comprising a corresponding nacelle according to claim 1.

* * * * *

UNITED STATES PATENT AND TRADEMARK OFFICE
CERTIFICATE OF CORRECTION

PATENT NO. : 8,448,896 B2  
APPLICATION NO. : 12/864925  
DATED : May 28, 2013  
INVENTOR(S) : Caruel et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 254 days.

Signed and Sealed this
Eighth Day of September, 2015

Michelle K. Lee
*Director of the United States Patent and Trademark Office*